April 30, 1968 F. SOMMERMEYER 3,380,363

FILM WINDING MECHANISM FOR PHOTOGRAPHIC CAMERAS

Filed Sept. 29, 1965

United States Patent Office 3,380,363
Patented Apr. 30, 1968

3,380,363
FILM WINDING MECHANISM FOR
PHOTOGRAPHIC CAMERAS
Friedrich Sommermeyer, Braunschweig, Germany, assignor to Rollei-Werke Franke & Heidecke, Braunschweig, Germany, a firm of Germany
Filed Sept. 29, 1965, Ser. No. 491,320
Claims priority, application Germany, Oct. 2, 1964,
R 38,903
7 Claims. (Cl. 95—31)

This invention relates to photographic cameras, and more particularly to the film winding mechanism for winding the film in such cameras.

An object of the invention is the provision of a generally improved and more satisfactory winding mechanism.

Another object is the provision of a simple and improved form of winding mechanism which can be used for cameras loaded either with film of normal length (e.g. 12 exposures) or with film of double length (e.g. 24 exposures) without wastage of film area between the first group of exposures and the second group of exposures, and without leaving the operator uncertain as to how many unused exposures are still available in the camera.

Still another object is the provision of such mechanism especially designed for cameras of the type in which the film is advanced (with simultaneous tensioning or cocking of the shutter) by operating a rotatary film winding member as far as it will go, the further rotation of the winding member being prevented until an exposure has been made.

These and other desirable objects may be attained in the manner disclosed as an illustrative embodiment of the invention in the following description and in the accompanying drawings forming a part hereof, in which.

The invention is especially intended for cameras of the type which automatically meter the advance of the film, without special attention on the part of the operator to observe a number or other indication on the film through a window in the camera body, but certain features of the invention are useful in cameras of other types also. A typical camera of the automatic film metering type, for which the present invention is particularly useful, is the well known "Rolleiflex" camera. For the sake of brevity, the following description of the invention assumes that the reader is already familiar with such cameras, and particularly with the references mentioned in Weiss Patent 2,926,424, granted Mar. 1, 1960, at column 2, lines 14–28 and lines 43–50 and especially familiar with the basic structure disclosed in Müller Patent 2,148,636, dated Feb. 28, 1939.

Reference may also be made to German Patents 614,-967, 708,549, 717,236, 862,549, and 877,248, some of which show further details of cameras of the same general type, and some of which offer partial solutions of the same problem with which the present invention deals, namely, the satisfactory use of double length film in a camera, the film counter of which is designed for single length film. It may be explained at this point that the single length film is usually paper-backed film. If a paper leader strip is used at the front end of the film strip, and a paper trailer strip at the rear end, and if the backing paper is omitted throughout the main length of the film, then approximately twice the usual length of film (e.g., enough film for 24 exposures) can be accommodated on the same film spool which will normally hold only a single length of film (e.g., 12 exposures) when the film has the usual paper backing throughout the length of the film as well as the necessary length of paper leader strip and paper trailing strip.

Figures 1A, 1B:
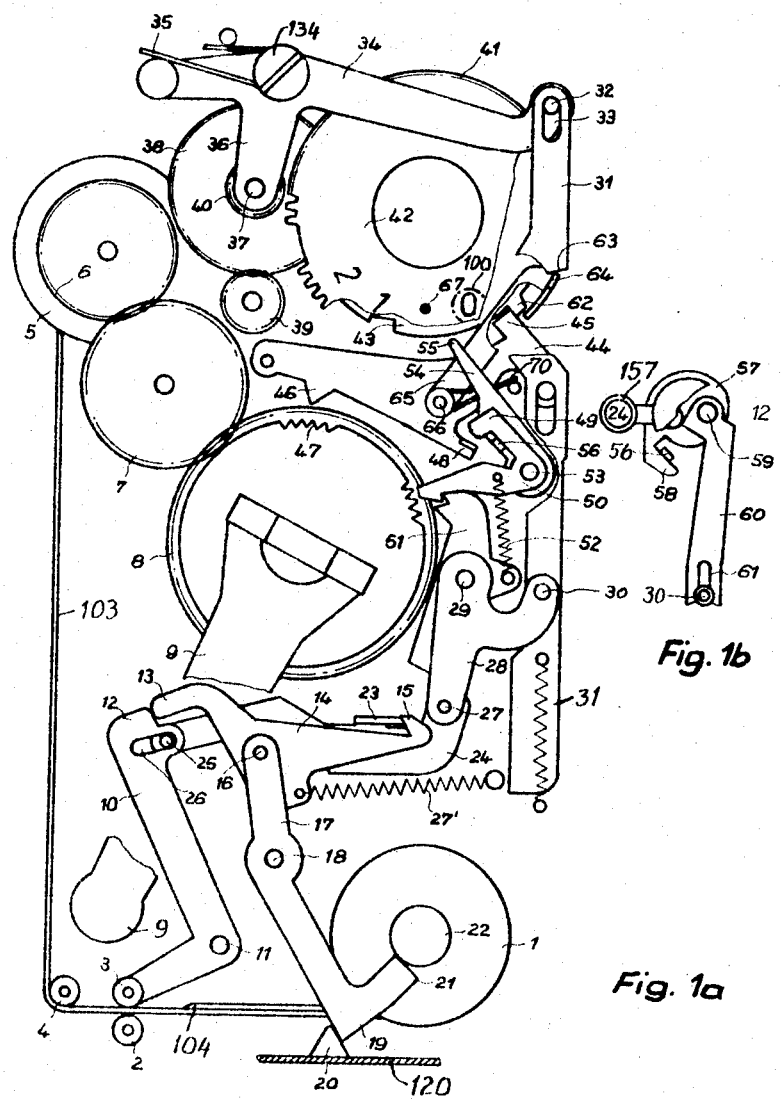
FIG. 1a is a somewhat schematic side elevation of winding mechanism according to a preferred embodiment of the invention, omitting parts unnecessary to an understanding of the invention, and showing the parts in the position assumed while the paper leader strip is being wound onto the takeup roll, before the first picture area of the film itself has reached the exposure position.
FIG. 1b is a fragmentary view of the change-over parts (for changing from single length film to double length film) which overlie certain of the parts shown in FIG. 1a, but which are omitted from that view for the sake of clarity.

Referring first to FIG. 1a, the basic structure is quite similar to that disclosed in the above mentioned Müller Patent 2,148,636. It comprises a film supply spool 1, from which the film travels between two rollers 2 and 3, and over a guide roller 4 to the film take-up spool 5 driven by toothed gears 6 and 7 from the gear wheel 8 of the main film advance member conveniently turned by a crank partially shown at 9. This corresponds in general to the crank 4 and main gear 6 of Müller patent. The roller 3 is mounted on one arm of a bellcrank lever 10 mounted on a fixed pivot 11. The other end 12 of the bellcrank lever engages one end 13 of a lever 14 the other end 15 of which is hook-shaped as shown, to engage a lug 23 as further described below. The lever 14 is pivoted on a pivot 16 carried by one end of the lever 17 which is pivoted intermediate its ends at 18. The other end 19 of this lever is adapted to engage a projection 20 on the camera back fragmentarily shown at 120, in such manner that when the camera back is closed, the projection 20 will swing the lever 17, 19 in a counterclockwise direction on its pivot 18, bringing the end 21 of the lever against a fixed stop 22, which can conveniently be in the form of one of the trunnions on which the film spool 1 is mounted. The camera back fragmentarily shown at 120 is shown in greater detail at 42 in the above mentioned Müller patent, in which patent the bellcrank lever 23 and the lever 45 correspond in general to bellcrank lever 10 and lever 17–19 of the present application, as will be readily understood by those skilled in the art.

When the camera back 120 is open, the spring 27' can move the lever 14 rightwardly from the position shown in FIG. 1a, and also can turn it counterclockwise on its pivot 16, to cause the hook 15 to engage the lug 23 on a link member 24, one end of which has a pin 25 engaged in the slot 26 of the lever 10. The other end of the link 24 has a pin 27 connecting it pivotally with a lever 28, pivoted on the fixed pivot 29 and pivotally connected at 30 to the approximately vertical link or slide member 31. The upper end of the link 31 has a slot 33 receiving a pin 32 on the lever 34 which is pivoted on a fixed pivot 134 and is urged in a counterclockwise direction on such pivot by the spring 35. One arm 36 of this lever 34 carries a pivot 37 on which is rotatably mounted the large gear wheel 38 and the small pinion 40. The large gear 38 meshes with the pinion 39 on the shaft of the film metering wheel, which metering wheel is not shown here but is well known in the art and is shown at 11 in the above mentioned Müller patent. The film metering wheel resiliently engages the film (or the paper backing, when one is present) which is being wound up on the take-up spool 5, being rotated by the winding of the film and causing rotation of the gear 38 which, in turn, rotates the pinion 40 so as to rotate the metering gear 41 of the counterdisk 42 and the associated notched disk 43. As well understood in the art, a light return spring (not shown) tends to turn the parts 41, 42, 43 in a clockwise direction to a predetermined initial starting position determined by engagement of a radial arm 62 on the disk 43, with an arm 45 on the locking lever 44 which is pivoted at 66 and which is urged by a spring in a counterclockwise direction on the pivot 66, so that when a notch in the periphery of the notched disk 43 comes opposite the arm 45, the lever 44 can swing in a counterclockwise direction sufficiently to bring its locking tooth 46 into engagement with the teeth 47 of a disk or wheel rotating with the crank 9, to stop the rotation thereof.

The parts thus far described operate in a manner quite similar to the above mentioned Müller patent, as will be readily understood by those skilled in this art. When a fresh supply of film has been inserted in the camera and threaded onto the take-up spool 5, and when the camera back 120 is closed, the projection 20 on the back will shift the lever 17, 19 in a counterclockwise direction, carrying the lever 14 leftwardly, so that the hook 15 thereof carries the link 24 leftwardly. This will cause the lever 28 to turn in a clockwise direction on its pivot 29, pulling the link 31 downwardly, thereby swinging the lever 34 in a clockwise direction on its pivot 134, against the force of the spring 35. This will move the pinion 40 leftwardly out of mesh with the gear teeth 41, so that the return spring of the metering mechanism 41, 42, 43 will now return this mechanism in a clockwise direction to its initial starting position, where the numeral "0" will appear through the sight window shown schematically at 100. The crank 9 can be turned clockwise to feed the film. At first, there will be no rotation of the metering parts 41, 42, 43 because the pinion 40 is still out of mesh with the gear teeth 41.

As the paper leader 103 advances, the advancing edge 104 of the actual film itself will reach the feeler roller 3. Since the thickness of the film strip plus the paper backer at this point is thicker than the thickness of the paper alone, the added thickness will displace the roller 3, turning the lever 10 in a clockwise direction and thus causing the end 12 of the lever to press against the end 13 of the lever 14, swinging the latter in a clockwise direction on its pivot 16 which at this time will be stationary because the lever 17, 19 is tightly held between the projection 20 and the fixed member 22. The swinging of the lever 14 will release the hook 15 from the lug 23, so that the force of the spring 35 can now turn the lever 34 in a counterclockwise direction, pulling upwardly on the link 31. This enables the pinion 40 to come into meshing engagement with the gear teeth on the metering gear 41, so this gear now begins to turn as a result of the rotation of the pinion 40 caused by rotation of the pinion 39 because of the above mentioned metering wheel riding on and being turned by the paper leader strip being wound onto the take-up spool 5. When feeding has been continued enough to bring the first picture area of the film 104 into proper exposure position, the metering member 41, 42, 43 will have been turned far enough to bring the first notch of the member 43 opposite the arm 45 of the lever 44, allowing the latter to turn counterclockwise so as to drop the tooth 46 thereof into the teeth 47 of the rotary feeding member, stopping rotation. At the same time, the portion 48 on the lever 44 raises the arm 49 of the pawl 50 which is pivoted at 53, against the force of its spring 52, so that the other end of the pawl 50 releases the main locking pawl 51 which, under the influence of the same spring 52, engages the teeth 47. The numeral "1" now appears through the window 100, and the camera is ready for taking the first exposure. At each exposure, the main locking pawl 51 is lifted out of engagement with the teeth 47, and the film winding crank can be actuated for further feeding of the film. All of this is well understood by those skilled in the art.

When the prescribed maximum number of exposures is reached, for example twelve exposures, a gap in the teeth of the gear 41 comes opposite the pinion 40, so that there is no further driving of the counter mechanism 41, 42, 43. No further notch in the disk 43 comes opposite the arm 45, so the locking means 45, 46 is no longer able to engage, and thus the crank 9 can continue to rotate without impediment, so that the paper trailer strip can now be wound onto the take-up spool 5.

This is the operation when the film in the camera has the same number of exposures as those for which the counter mechanism 41, 42, 43 is designed. However, if the film in the camera is longer (e.g., double length film without paper backing but with paper leader and trailer strips) then there should be mechanism to prevent the locking means from becoming ineffective at the end of the twelfth exposure. The present invention provides means for preventing the locking means from becoming ineffective. To this end, there is a lever 54 underlying the pawl 49 and pivotally mounted on the same pivot pin 53 on which the pawl is mounted. The lever 54 has a pointed end 55 which lies close to the periphery of the notched disk 43, and which lies in the path of travel of the above mentioned radial arm 62.

For operating this lever 54, it has an upstanding ear or lug 56 which passes upwardly beyond the plane of the pawl 49 and into the plane of a cam disk 57 which is rotatably mounted in overlying relation to the parts 49 and 54. The cam disk 57 may be rotatably mounted in any convenient way, for example being rotatable on the inner face of the side wall of the camera body, with a finger piece or operating arm 157 extending out through a slot in the camera body, to be accessible for manipulation from the outside. When the lever 54 is swung in a clockwise direction, the lug 56 thereon carries the pawl 49 with it, so that the locking hook 50 is lifted away from the film wind locking pawl 51 and the latter can engage the locking teeth 47 of the crank mechanism.

The cam disk 57 has a hook-like projection 58 adapted to engage the lug or ear 56 to hold the end 55 of the lever 54 in the immediate vicinity of the periphery of the notched disk 43. It will be understood that the cam disk 57 and associated parts shown in FIG. 1b actually overlie the parts near the right hand edge of FIG. 1a, but have been omitted from FIG. 1a and shown in a separate view, for the sake of greater clarity.

The cam disk 57 also carries a pin 59, eccentric to the axis of rotation of the cam disk. A push rod 60 has its upper end pivoted on the pin 59, and the lower end has a slot 61 which engages the upstanding end of the pin 30 which serves to connect the lever 28 to the link 31. The parts are so proportioned, that when the finger piece 157 is manipulated to turn the cam disk 57 clockwise from the position shown in FIG. 1b, through the intermediate position shown in FIG. 4, to the ultimate position shown in FIG. 5, the link 60 will push downwardly on the pin 30 and thus move the link 31 downwardly to swing the lever 34 in a clockwise direction to move the pinion 40 out of engagement with the gear teeth 41. This occurs as the cam disk 57 reaches the intermediate position shown in FIG. 4. Then as it completes its clockwise movement to the position shown in FIG. 5, the link 60 is raised once more, allowing the link 31 to move upwardly again under the power of the spring 35, and allowing the pinion 40 to mesh again with the gear teeth 41.

Figure 2:
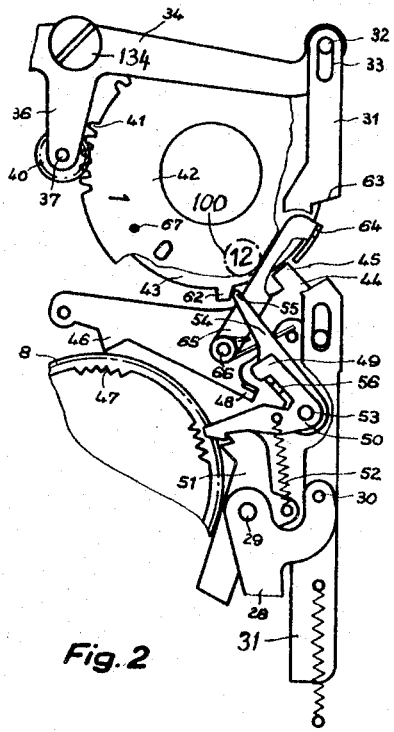
FIG. 2 is a view similar to a fragment of FIG. 1, showing the parts at the conclusion of the twelfth exposure.
Figure 3:
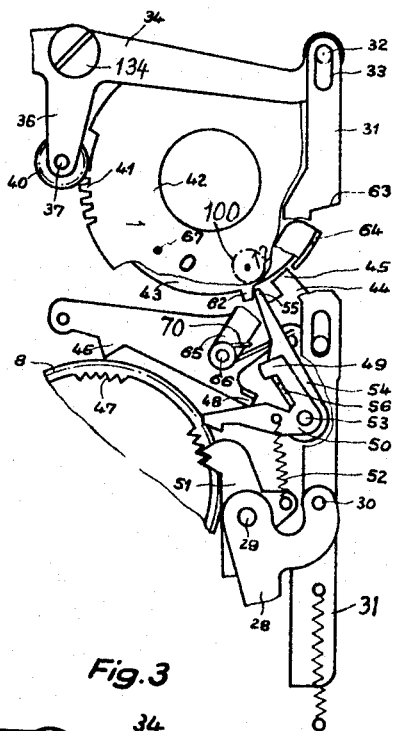
FIG. 3 is a similar view showing the parts advanced slightly further than shown in FIG. 2, the film winding lock having meanwhile become effective.

When the first half of the film strip has been exposed and the picture area or frame 12 has been reached, so that the numeral 12 appears through the window 100, the parts are in substantially the position shown in FIG. 2. Then, assuming that the hand lever 157 is in the position shown in FIG. 1b, the beginning of the next rotation of the crank 10 will cause the tooth 62 to move the lever 54 in a clockwise direction on its pivot 53, thereby raising the pawl 49 and unlocking the main locking pawl 51 which, under the influence of its spring 52, will now engage the teeth 47 and prevent further rotation of the crank 9. This position is shown in FIG. 3. It is seen that the metering mechanism 41, 42, 43 has moved only a slight distance counterclockwise from the position of FIG. 2 to the position of FIG. 3, with the frame number 12 just slightly beyond the position of correct alinement with the window 100. The lever 54 serves as a lock for the counter mechanism, since the lever 54 cannot turn any further in a clockwise direction because the ear 58 thereon can move only a limited distance, from the position of engagement with the hook 58 on the disk 57, to a position of engagement with another part of the cam disk 57.

The locking of the crank 9 against further winding movement draws the operator's attention to the fact that he has exposed only the first half of a double length film strip, and that there are additional exposures still to be made on the same film. To prepare the camera for exposing the second half of the length of the film, the operator now grasps the handle 157 and turns it clockwise from the position shown in FIG. 1b through the position shown in FIG. 4 to the position shown in FIG. 5. In the intermediate position shown in FIG. 4, the link 60 is depressed as already mentioned, thereby depressing the link 31 and moving the pinion 40 out of engagement with the gear teeth 41, so that the light return spring can return the counter mechanism. However, it is desirable not to return the counter mechanism all the way to its normal initial starting position, because if this were done, there would be a wastage of film area between exposure 12 and exposure 13, on account of the fact that the counter mechanism is designed to be in its initial position when the advancing edge of the film reaches the feeler roller 3, and does not move to the "1" position until the advancing end 104 has reached the top of the exposure area.

Therefore, the present construction includes a tooth 64 on a lever 65 which is pivoted at 66 on the same pivot on which the locking lever 44 is pivoted. This tooth 64 is operatively connected to the slide 31 in a non-positive manner by virtue of the inclined cam portion 63 on the slide 31. A spring 70 tends to turn the lever 65 counterclockwise to tend to hold its tooth 64 in the path of travel of the tooth 62 on the notched disk 43. When the link or slide 31 comes down all the way to its lowest position, as caused by the mechanism 14, 17, 19 when the camera back 120 is closed, the inclined cam portion 63 thereon cams the tooth 64 outwardly away from the notched disk 43, so that it does not obstruct the arm 62 thereon. But when the link or slide 31 is depressed downwardly by actuation of the rotary cam 57 to the position shown in FIG. 4, the link 31 is pushed downwardly to a lesser extent, sufficient to disengage the pinion 40 from the teeth 41, but not sufficient to move the tooth 64 out of the path of travel of the arm or tooth 62 on the notched disk 43. Consequenly, when the operator moves the finger piece 157 from the position shown in FIG. 1b to the position shown in FIG. 4 (on its way to the ultimate position shown in FIG. 5) the pinion 40 is released from the counter mechanism but the tooth 64 lies in the path of travel of the tooth 62 as seen in FIG. 6. The result is that the return spring on the counter mechanism 41, 42, 43 is not able to return the counter mechanism all the way to its initial starting position shown in FIG. 1a, but can return it only to the position shown in FIG. 6, not quite as far as the normal initial starting position. In this position, a suitable mark such as a dot 67 on the counter numeral disk 42 appears through the window 100, instead of the numeral "0."

Figure 5:
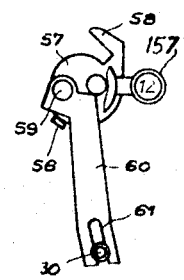
FIG. 5 is a similar view showing the change-over knob at the end of the change-over operation.
Figure 6:
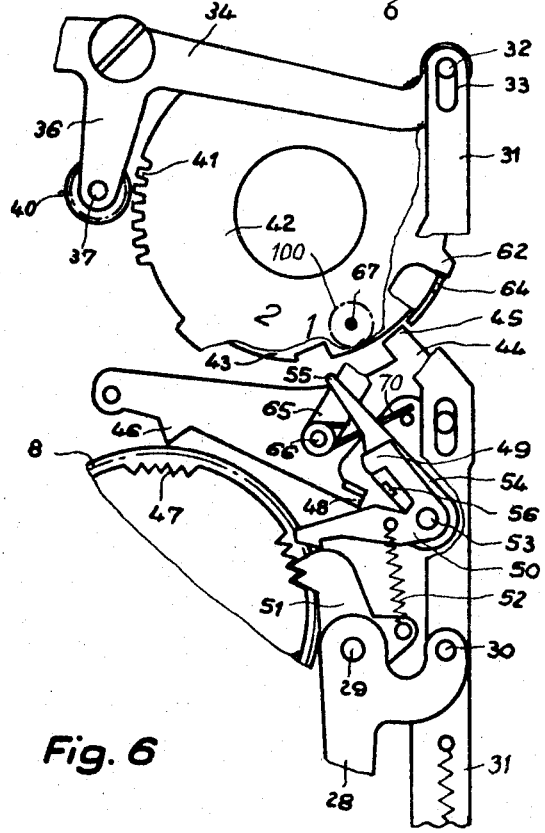
FIG. 6 is a view similar to FIGS. 2 and 3 showing the position of the parts of the winding mechanism upon starting to advance the second half of the film.

When the change-over cam 57 completes its movement to the position shown in FIG. 5, a portion of the cam pushes against the ear 56 and swings the lever 54, 55 in a counterclockwise direction on its pivot 53, to an ineffective position where it does not lie in the path of travel of the tooth 62 on the notched disk 43, and does not obstruct the movement of the pawl 49 to its locking position with respect to the main locking pawl 51. The operator now winds the film by turning the crank 9, to the first exposure position for the second half of the length of film, when the numeral "1" appears through the window 100, this being the position for taking the 13th exposure on the double-length film strip. Exposures are continued on the second half of the film strip just as though it were a strip of only 12 exposures, and when the numeral 12 appears in the window 100, it is really the 24th exposure, the last one on the strip. When this exposure has been made, the mechanism then operates in the usual conventional way to permit the crank 9 to be turned repeatedly so as to wind up the trailing strip of paper onto the take-up spool 5. When the camera back 120 is opened to take out the exposed spool of film and to insert a fresh spool, the subsequent closing of the back causes the projection 120 to operate the lever 19 to move the slide or link 31 all the way down to its bottom position, not only disengaging the pinion 40 from the teeth 41 but also disengaging the tooth or abutment 64 (through action of the cam surface 63) to move it out of the path of the tooth 62 on the notched disk, so that the counter mechanism can be returned all the way to its normal starting position with the numeral "0" appearing through the window 100.

The two positions of the cam disk 57 are preferably indicated in some suitable way, for example, by the numbers "24" and "12" appearing on the camera body adjacent the two extreme positions of the handle 157. When the user loads the camera with double length film having space for 24 exposures, he initially moves the handle 157 to the "24" position shown in FIG. 1b. Then after the first 12 exposures are made, the fact that the handle 9 will turn through only a small fraction of a revolution and cannot be turned through the normal feeding amount, indicates to the operator that he must now shift the change-over mechanism in order to take exposures on the second half of the film. He does this by swinging the arm 157 180 degrees in a clockwise direction, from the position shown in FIG. 1b to the position shown in FIG. 5, that is, to the "12" exposure position, and this movement of the arm 157 has the effect of resetting the counter mechanism 41, 42, 43 in the manner above described, not quite to the initial starting position but to a suitable position for starting the second group of 12 exposures as explained above. If the film happens to have more than 24 exposure areas, the operator can swing the handle 157 from the "24" position of FIG. 1b through only 90 degrees to the position shown in FIG. 4, and then swing it back counterclockwise to the "24" position shown in FIG. 1b, so that at the end of the 24th exposure the feeding mechanism will again be locked and the operator can again manipulate the handle 157 to prepare the mechanism for a third set or series of exposures, if the film is sufficiently long.

Figure 4:
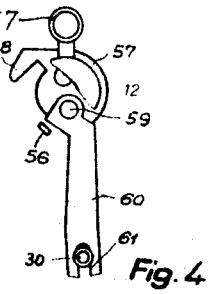
FIG. 4 is a view similar to FIG. 1b showing the change-over knob at an intermediate position during the manipulation to shift from the first series of twelve pictures to the second series.

It is noted also that disengagement of the metering and counting mechanism can be effected at any time, by swinging the handle 157 and the cam 57 to the position shown in FIG. 4, and leaving it there, thus disconnecting the counter mechanism and enabling any remaining amount of film, together with the trailer strip of paper, to be wound up onto the take-up spool 5.

The use of the arrangement according to this invention is not restricted to cameras in which the winding mechanism is actuated by a crank which is turned first forwardly and then backwardly to an initial starting position, each time the film is wound. The invention is equally applicable to those cameras in which film winding is effected by continuous forward rotation of a crank or knob.

The present invention has several advantages over the prior art. Among them may be mentioned the following: the forgetful user need not be confused as to whether he has loaded the camera with film of conventional length or of double length, since he moves the cam disk 57 and its handle 157 to the position shown in FIG. 1b when he loads the camera with double length film, thus giving a visual indication of the double length nature of the film, so long as he is taking pictures on the first half thereof. He also knows whether he is operating, at any given moment, on the first half or the second half of the film, since the handle 157 will be in the position shown in FIG. 1b while he is using the first half of the double length film, and will normally be in the position shown in FIG. 5 while he is using the second half of the double length film. The position of FIG. 5 does not distinguish between a film of ordinary conventional length, and the second half of a film of double length, but there is ordinarily no need to make such a distinction, for in either event the operator can see, from the numerals appearing through the window 100, how many exposures have been made (on the conventional film, or on the second half of a double length film) and thus he knows how many exposures still remain to be taken. It is not necessary to pay any special attention to returning the counter to a new starting position at the beginning of use of the second half of the film, since this is automatically done by shifting the cam 57 and handle 157 at the conclusion of use of the first half of the film. Nor can the operator forget to make this shift, because if he does not shift, the winding crank remains locked. Also, the present construction enables the 13th exposure to be made in the next area immediately after the 12th exposure, without any unused intermediate space. Moreover, at any time, the operator can decide that he wishes to roll the remaining film onto the take-up spool even if he has not taken all of the available exposures, so as to develop the roll to see the pictures he has already taken, even though some potential exposure areas may be wasted, and he can do this simply by shifting the cam 57 and handle 157 to the position shown in FIG. 4, and then winding the crank 9 unobstructedly, without having to operate the shutter at the end of each separate exposure winding operation.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. Camera film winding mechanism adapted for use with either single length film having space for a normal number of exposures or double length film having space for double the number of exposures and comprising counter mechanism having a normal initial starting position, a manually operable winding member normally operatively connected to said counter mechanism for advancing film and simultaneously advancing said counter mechanism through an increment, and means for temporarily locking said winding member at the end of each increment of advance and for unlocking said winding member at the conclusion of making a normal number of exposures so that said winding member may be operated unobstructedly to wind up a trailer strip at the end of a single length film, characterized by the provision of (a) a stop member shiftable between an effective position in the path of travel of a portion of said counter mechanism and an ineffective position out of said path of travel, (b) a manually operable control member shiftable from a first position holding said stop member in its effective position to a second position placing said stop member in its ineffective position, and (c) an abutment member shiftable from a first position serving as an abutment for determining a starting position of said counter mechanism different from said normal initial starting position thereof, to a second position ineffective to influence the starting position of said counter mechanism, (d) means operated by advancing movement of said counter mechanism beyond a position for a last exposure of a normal number of exposures, for moving said stop member when in its effective position, (e) means operated by such movement of said stop member for locking said winding member, and (f) means operated by shifting said control member from its first position to its second position for causing said counter mechanism to turn back from its actuated position toward its starting position to an initial position determined by said abutment member.

2. A construction as defined in claim 1, in which the winding mechanism further includes means operated upon completion of loading the camera with film, for operatively disconnecting said counter mechanism from said winding member and causing said counter mechanism to turn back from its actuated position to its normal initial starting position, further characterized by (g) means operated upon completion of loading the camera with film, for shifting said abutment member to its second position.

3. A photographic camera having a closure member movable to a predetermined position upon completion of a film loading operation, feeding means for advancing film through successive increments, exposure counting means normally operatively connected to said feeding means to be advanced thereby from a starting position to successive increment positions up to a position representing the maximum number of normal exposures on normal length film, and means including a link movable through a predeterined range by the act of moving said closure member to its predetermined position, for opertively disconnecting said counting means from said feeding means so that said counting means may be returned from its advanced position toward its normal starting position, characterized by a manually shiftable control member movable from a first position to a second position, an abutment member shiftable between an ineffective position and an effective position effective to stop the return movement of said counting means in a position slightly in advance of its normal starting position, a cam portion on said link for moving said abutment member from its effective position to its ineffective position during the latter part of movement of said link through its said predetermined range, and means operated by movement of said control member between its two positions, for moving said link far enough to disconnect said counting means from said feeding means, but not far enough to cause said cam portion on said link to move said abutment member to its ineffective position, so that when said link is moved by shifting said control member, said counting means may return only to a position determined by said abutment member, and so that when closure member is moved to said predetermined position, said abutment member will be rendered ineffective by said cam portion and said counting means may return all the way to its normal starting position.

4. A construction as defined in claim 3, further characterized by stop means effective when said control member is in one of its positions and ineffective when it is in the other of its positions, for stopping forward movement of said feeding means and said counting means substantially at the conclusion of the maximum number of normal exposures.

5. A roll film camera for optical use with film of double the normal length, comprising film winding mechanism including advance-limiting and exposure counting mechanism driven by a film metering roller under tension of a return spring, which mechanism becomes inoperative after a number of exposures corresponding to a normal length of film has been reached, for the purpose of unobstructed winding of a protective paper trailer strip, characterized by the provision of a stop member (54, 55) which can be engaged at will and which becomes operative upon reaching the normal exposure number to stop further advance of said winding mechanism and exposure counting mechanism, and a manually operable disengaging device (57, 58, 60) which temporarily uncouples the counter mechanism, which device is operatively connected to an abutment member (64) which, in its operative position, prevents the complete return of the counter mechanism to its initial position, so that said counter mechanism is again prepared for a first winding step when running through the second half of the double length film.

6. A construction according to claim 5, further characterized in that the stop member (54, 55) comprises a locking device adapted to be moved into the path of a portion (62) of the counter mechanism and provided with a driver member (56) for engaging a release device (50) of a locking pawl.

7. A construction according to claim 5, further characterized by the provision of a rest provision stop (64) for a counter mechanism portion (62) and a spring (70) to hold said stop in its operative position, said stop (64) being so disposed in the path of a portion (63) of an uncoupling linkage (31) for the counter mechanism that said stop (64) is inoperative when said linkage is in a position for winding a leader strip on the film, but remains operative when said linkage is actuated by said manually operable disengaging device.

References Cited
UNITED STATES PATENTS 3,073,299   1/1963   Madge _____ 242—71

NORTON ANSHER, *Primary Examiner.*

R. A. SCHROEDER, *Assistant Examiner.*

UNITED STATES PATENT OFFICE
CERTIFICATE OF CORRECTION

Patent No. 3,380,363                          April 30, 1968

Friedrich Sommermeyer

It is certified that error appears in the above identified patent and that said Letters Patent are hereby corrected as shown below:

Column 10, line 5, "provision", second occurrence, should read -- position --.

Signed and sealed this 9th day of September 1969.

(SEAL)
Attest:

Edward M. Fletcher, Jr.                      WILLIAM E. SCHUYLER, JR.
Attesting Officer                                Commissioner of Patents